METHOD OF MANUFACTURE OF POTASSIUM-SODIUM-NIOBATE CERAMICS

Filed April 28, 1958

INVENTORS L. EGERTON
S. S. FLASCHEN
BY George S. Indig
ATTORNEY

United States Patent Office 2,976,246

Patented Mar. 21, 1961

2,976,246

METHOD OF MANUFACTURE OF POTASSIUM-SODIUM-NIOBATE CERAMICS

Lawson Egerton, Basking Ridge, and Steward S. Flaschen, New Providence, N.J., assignors to Bell Telephone Laboratories, Incorporated, New York, N.Y., a corporation of New York Filed Apr. 28, 1958, Ser. No. 731,465

5 Claims. (Cl. 252—62.9)

This invention relates to a method for producing potassium-sodium-niobate ceramics and to ceramics so produced. The ceramics produced in accordance with the present invention, which are possessed of a high piezoelectric activity and a low dielectric constant, find special application in electromechanical transducers for use in high frequency application such as delay lines.

Substantially the full range of potassium-sodium-niobate ceramics exhibit ferroelectric properties within a specified temperature range. Specifically, compositions in the range from $K_{.9}Na_{.1}(NbO_3)$ to $K_{.1}Na_{.9}(NbO_3)$ are ferroelectric. Ferroelectricity is a phenomenon associated with the spontaneous polarization of groups of ionic dipoles in the crystal lattice so as to form electrically polarized domains. These domains usually are arranged within the material so as to effectively neutralize each other and present no substantial external electric field.

Application of an electric field to a body composed of ferroelectric material causes growth of those domains having their direction of polarization most nearly aligned with the direction of the applied field, at the expense of the other domains, and also causes some orientation, toward the direction of the field, of the direction of polarization within the domains that remain. The result is a net overall polarization of the body to which the field is applied.

A ferroelectric body subjected to an electric field exhibits piezoelectric properties in that it changes in physical size in response to changes of a potential applied across the body in a direction parallel or perpendicular to the direction of the biasing field. Additionally, such body generates a potential when subjected to a mechanical stress.

For convenience, a residual polarization may be induced in a ferroelectric body to dispense with the necessity of subjecting it to an externally applied electric field during operation. Such residual polarization is achieved by subjecting the ferroelectric body to a field for a substantial period of time, preferably at elevated temperatures. A method found suitable for use with the range of ceramics under discussion is described in United States Patent No. 2,706,326, issued to W. P. Mason.

The degree of efficiency of a piezoelectric body in transforming electrical energy to mechanical energy is expressed as the electromechanical coupling coefficient. This coupling coefficient is strongly dependent upon the extent to which the ferroelectric domains of the piezoelectric body have the same orientation. The magnitude of the coupling coefficient also depends on the mode in which the body vibrates. A thin plate may be caused to vibrate in thickness shear mode when the electrical signal is applied perpendicular to the direction of polarization. The longitudinal mode of vibration occurs when the applied signal and direction of polarization are parallel.

The earliest known materials which exhibited piezoelectric properties were monocrystalline materials such as quartz and Rochelle salt. However, these materials were disadvantageous in that elements for use as electromechanical transducers had to be cut along certain planes and axes of the crystal. It was subsequently determined that polycrystalline ceramic bodies can be used in place of the monocrystalline piezoelectric materials mentioned above. Such ceramic bodies are made by preparing crystals of a ferroelectric material in a finely divided state, mixing with a small amount of temporary binder if necessary, pressing the mixture into the desired shape, and firing the pressed body at a temperature sufficient to volatilize any binder present and to sinter the particles so as to form a compact ceramic mass. The use of such ceramics have gained favor by reason of the ease with which they may be worked and the fact that they may be molded into any desired shape.

An important use for materials exhibiting piezoelectric properties is in the manufacture of electromechanical transducers for use in delay lines. A delay line is a simple means for delaying the transmission of or storing a signal. Delay lines are used as storage devices in switching systems and in computers, and are useful as balancing devices to eliminate reflections in radar systems and in long-distance telephone lines. A common form of delay lines consists of a bar of elastic material, which acts as a mechanical transmission line with electromechanical transducers at each end. (See, for example, copending U.S. application Serial No. 426,865, now U.S. Patent No. 2,861,247.) The electrical signal to be delayed is impressed on the transducer, thereby setting up an ultrasonic mechanical vibration in the ceramic which is communicated to the transmission line. After passage through the transmission line, the ultrasonic vibrations impinge upon a receiving transducer, which converts them back into electrical impulses corresponding to the original signal. The velocity of propagation of the ultrasonic vibrations is so small, compared with that of electrical impulses, that a signal reaching a certain point in the circuit through wholly electrical paths of the same physical length will arrive a substantial length of time before one reaching that point through a path including the mechanical transmission line.

The delay lines in which these ceramics are employed are operated in the megacycle range. At these high frequencies, the use of known piezoelectric materials results in disadvantageous side effects. Since for efficient operation the electromechanical transducers incorporating the ceramic elements are usually tuned to the resonant frequency at which the delay line is operated, there is usually included in the circuit in its appropriate place, an inductance, which, in conjunction with the capacitance of the transducer forms a resonant circuit. Since the ceramic element, as it is used in the transducer, corresponds to the dielectric medium in a conventional capacitor, the capacitance of the transducer increases proportionately to the area and inversely proportional to the thickness of the ceramic element. The dielectric constant of the ceramic is also a determinant in the size of the capacitance in question. Thus, increasing the cross-sectional area and/or the dielectric constant of the ceramic element, and/or decreasing the thickness thereof, increases the capacitance of the transducer.

As the capacitance of the transducer increases, the size of the inductance necessary to resonate the circuit decreases. Problems of constructions are encountered at very high capacitances since stray inductances due to ordinary wiring prevent proper tuning of the transducer. At this point, another factor must be considered. For maximum efficiency, the ceramic element should be of a thickness corresponding to one-half wavelength of the carrier frequency at which the delay line is operated. Thus, at a particular operating frequency, an objectionably high capacitance may not be decreased by the simple expedient of increasing the thickness of the ceramic.

Reducing the operating frequency to enable the use of a thicker ceramic element is usually not available as a means of decreasing capacitance, due to considerations of bandwidth. Bandwidth as used here is defined as the quotient of the width of the band transmitted with less than 3 decibel attenuation in cycles per second, divided by the frequency at which the delay line is operated in cycles per second. In delay lines of the type under discussion, decreasing the operating frequency produces an essentially proportional decrease in the bandwidth. Since the transmission of sharp pulses of energy through a delay line necessitates a wide bandwidth, the carrier frequency must be chosen with this factor in mind. The use of a low carrier frequency results in a decreased bandwidth, all other things remaining equal, and causes distortion of the pulses being transmitted.

Another solution to the problem of high capacitance is to reduce the cross-sectional area of the ceramic element. However, in so reducing the cross-sectional area of the element another obstacle is introduced in the form of energy loss from the transmission line due to diffraction effects. Ideally, the mechanical energy should travel through the transmission line in a beam parallel to the axis of the transmission line. The cross-sectional area of the ceramic element used in the transducer is the determining factor in the degree of collimation of the ultrasonic beam traveling through the transmission line. As the cross-sectional area of the ceramic element is decreased, the resulting beam is less collimated and the portion of the transmitting energy which is lost by diffraction increases.

In view of the foregoing, it is apparent that the ideal solution to the problem of high capacitance is the use of a ceramic of low dielectric constant. Provided the electromechanical coupling coefficient of such ceramic is relatively high, the material would be ideally suited for delay line applications of the type discussed above. The ceramics produced in accordance with the present invention meet these specifications.

In accordance with the process of this invention, a range of ceramics in the potassium-sodium-niobate system is produced, the physical and electrical characteristics of which are dependent upon the parameters used in the various steps of the inventive process. Specifically, the ceramics of this invention are possessed of low dielectric constants and high electromechanical coupling coefficients. A preferred composition in the range, corresponding to the formula $K_{.5}Na_{.5}(NbO_3)$, which has a dielectric constant of 300 and a radial coupling coefficient of 34 percent is advantageously employed in delay line applications.

In fact, the preferred range of ceramics for such use extends from ceramics containing 75 percent potassium—25 percent sodium to 25 percent potassium—75 percent sodium. The low dielectric constant of these ceramics makes possible the use of transducers and delay lines of larger cross-sectional areas, thereby decreasing the losses attributed to diffraction. Alternatively, the delay lines may be operated at a higher frequency so as to increase the bandwidth, if desired. The dielectric constant and electromechanical coupling coefficient of these ceramics are both strongly dependent on the temperatures utilized in the calcining and firing steps, as is discussed in detail below. For example, a variation of approximately one percent in the firing temperature in the process of producing a particular ceramic has been found to produce a change of approximately twenty-seven percent in the coupling coefficient.

The present process comprises the steps of mixing and grinding sodium carbonate ($Na_2CO_3$), potassium carbonate ($K_2CO_3$), and niobium pentoxide ($Nb_2O_5$) in proportions calculated to produce the desired ceramic composition. As an illustration, in the preparation of a ceramic of the composition $K_{.5}Na_{.5}(NbO_3)$, the ingredients are mixed in the ratio of one-half mole of sodium carbonate, one-half mole of potassium carbonate, and one mole of niobium pentoxide. This mixture of ingredients is then calcined, preferably at a temperature in the range of 900° C. to 975° C.

The resultant material is leached with a dilute hot aqueous potassium carbonate solution. This leaching step has been found to improve the electrical properties of the ceramics, resulting in better control of the dielectric constant and higher coupling coefficients. After drying, the material is molded into the desired shape under high pressure. The molded shape is then fired at a temperature in the range of 1105° C. to 1115° C.

Following the firing step, the ceramic shape is polarized, conveniently in the manner described in United States Patent 2,706,326, to impart a high electromechanical coupling coefficient to the material. To accomplish the polarization, the ceramic is heated to a temperature of approximately 220° C., and then subjected to a direct current polarizing field of the order of 30 to 50 volts per mil. The ceramic is then cooled to approximately room temperature while still under the influence of the polarizing field.

By use of the present process, ceramic transducer elements have been prepared with dielectric constants as low as 125 and electromechanical coupling coefficients measured in the radial mode as high as 34 percent.

The invention may be more easily understood by reference to the figures in which.

Referring again to Fig. 1, it is seen that for given processing conditions described more fully herein, the dielectric constant is a function of the composition of the ceramic. At the high sodium end (right-hand side of the graph) the dielectric constant is low. For instance, at 75 mole percent sodium, corresponding to a ceramic of the formula $K_{.25}Na_{.75}(NbO_3)$, the dielectric constant is 200. At 75 mole percent potassium, corresponding to a ceramic of the formula $K_{.75}Na_{.25}(NbO_3)$, the dielectric constant is 400. This fortuitous circumstance enables the preparation of a ceramic for a particular end use, that is to say, the ceramic transducer element may be tailored to fit the application.

Figure 1:
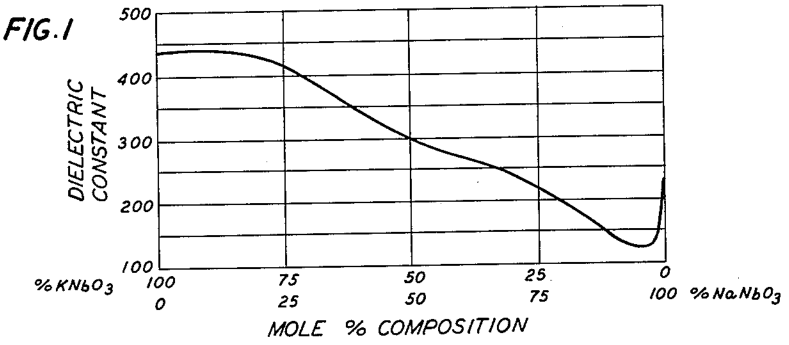
Fig. 1 is a graph depicting a change of the dielectric constant with composition of the ceramics produced in accordance with the present invention.
Figure 2:
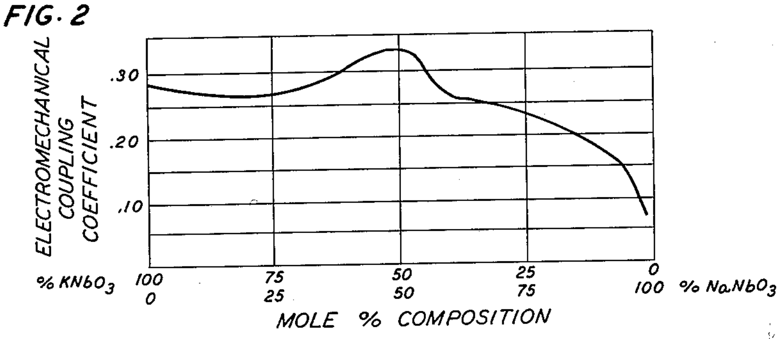
Fig. 2 is a graph depicting the change in electromechanical coupling coefficient with composition of ceramics produced in accordance with this invention.

Fig. 2 depicts the change in electromechanical coupling coefficient (measured in the radial mode) as a function of the composition of the ceramics of Fig. 1. It is seen that a high coupling coefficient obtains across the range from 90 mole percent potassium to approximately 10 mole percent potassium. The peak at the midpoint, $K_{.5}Na_{.5}(NbO_3)$, makes this composition preferred where a high coefficient is desired.

Figure 3:
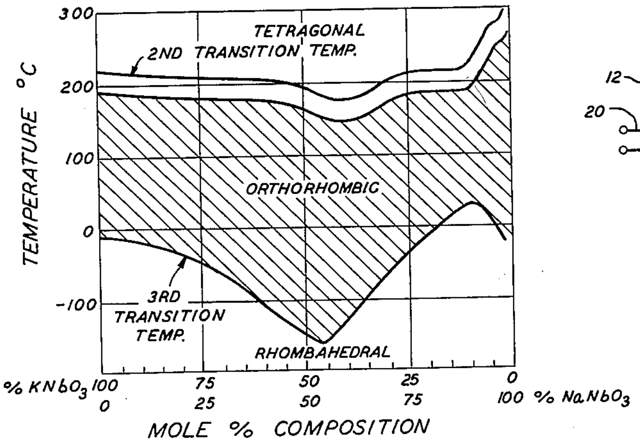
Fig. 3 is a graph depicting the operating temperature range of the ceramics made in accordance with the present invention.

Fig. 3 depicts the second and third transition temperatures of the ceramics as a function of composition. The second transition temperature lies between the tetragonal and orthorhombic states, and the third transition temperature lies between the orthorhombic and the rhombohedral states. These temperatures determine the operating temperature range of the ceramic which is cross-hatched. Operating at temperatures too close to the second transition temperature may partially depolarize the material. The upper temperature limit for operation of the ceramic is approximately 25° C. below this transition temperature for all compositions. Operating below the third transition temperature will cause a rearrangement of the crystal lattice and thereby affect the degree of polarization of the material.

Figure 4:
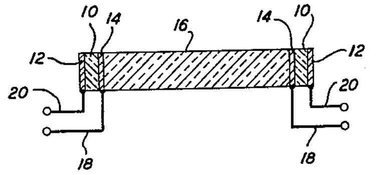
Fig. 4 is a sectional view of a delay line employing a ceramic transducer element produced in accordance with the present invention.

Fig. 4 represents a delay line employing a ceramic transducer element made in accordance with the present invention. In Fig. 4 can be seen a transmission line 16 to which is bonded, at each of its ends, a ceramic element 10 which acts as an electromechanical transducer. The bonding medium 14 may be any of those conventionally used in the art. (See, for example, copending application Serial No. 426,865.) In the event that the bonding material is electrically non-conductive, a thin electrically conductive layer or plating is applied to the ceramic elements 10 prior to bonding. A thin electrically conductive layer or plating 12 is applied to the other side of the ceramic elements 10 and electrical leads 20 and 18 are connected to the ceramic elements 10 as shown.

In the arrangement of Fig. 4, a pulse or signal is impressed across one of the ceramic elements, causing it to vibrate. The vibrations are transmitted through transmission line 16 and impinge upon the second ceramic element. The second ceramic converts the mechanical energy back into electrical energy, and the signal is then transmitted by means of the lead wires to the rest of the system of which the delay line is a component.

The initial step in the preparation of a ceramic in accordance with this invention is the preparation of the mixture for calcining. To produce a ceramic of prescribed composition, stoichiometric quantities of the component materials are added together. Thus, for example, to produce a ceramic of the composition $K_{.5}Na_{.5}(NbO_3)$, a mixture in the proportion of one mole of niobium pentoxide ($Nb_2O_5$), one-half mole of potassium carbonate ($K_2CO_3$), and one-half mole of sodium carbonate ($Na_2CO_3$) is prepared. It has been determined that the use of one-tenth mole percent excess of each of the carbonates over the exact stoichiometric quantities insures the desired stoichiometry in the finished ceramic resulting in better control of the desired characteristics.

The components are mixed thoroughly. This may be accomplished, for example, by use of a ball mill or other equivalent mechanical means for mixing. The material is then dried at a temperature above 100° C. to remove any water or other liquids which may have been introduced during the mixing step. The dried material is then crushed and screened to eliminate large particles which may have formed during the mixing or drying operation. It has been found convenient to use a 100 mesh screen for this purpose.

This material is then calcined in an oxidizing atmosphere at a temperature chosen in accordance with considerations to be discussed in detail below. During the calcination step the constituents react to form potassium-sodium-niobate. The calcined material is then crushed and screened to eliminate large particles which may have formed during the calcination process. A 40 mesh screen is conveniently used for this purpose.

The screened powder is then leached with a hot aqueous potassium carbonate solution of strength 2 percent by weight. The temperature of the solution should be above 60° C., preferably between 70° C. and 100° C. The strength is not critical, the carbonate being used to make the solution alkaline to a pH of approximately 11. This leaching step is preferably repeated at least once, with the resultant solid being washed in hot water until no alkalinity is detected in the wash water.

The ceramic material is then dried at a temperature of at least 100° C. Following the drying operation the material is crushed and screened to eliminate any large particles, a 100 mesh screen being suitable for this purpose.

The dried powder is then placed in a mold and subjected to pressures in the order of five thousand pounds per square inch to form the desired shape of the ceramic element. In certain instances where large pieces are desired, it has been found convenient to use an organic binder of the type commonly used in the art in quantities up to ten percent by weight. In such instances, forming pressures of the order of ten thousand pounds per square inch are used.

The molded pieces are then fired in an oxidizing atmosphere, at a firing temperature to be discussed in detail below.

After the firing step, the ceramic element is polarized. It will be assumed for the purposes of this description that the ceramic is in the shape of a disk. If the ceramic is to be vibrated in the radial mode, the polarizing potential gradient is applied across the thickness, and when the ceramic is in use the driving signal is also applied across the thickness. This makes possible the use of the same electrodes for the polarization and driving of the ceramic.

The electrodes are placed on the major faces of the disk by applying silver paste and firing, in the conventional method. The ceramic is then immersed in an oil bath, which is maintained at a temperature slightly above the second transition temperature, which as seen from Fig. 3, is approximately 200° C. for all compositions. It has been determined that polarizing at a temperature in the range of 220° C. to 230° C. produces satisfactory results. After the ceramic has reached the polarization temperature a direct current field in the order of 30 to 50 volts per mil is applied across the electrodes. The ceramic is then allowed to cool slowly to room temperature at a rate of approximately 3° C. per minute while subjected to the polarizing field.

For those applications in which the ceramic element is vibrated in the shear mode, such as in certain delay lines, a different procedure must be employed. For these purposes a ceramic element of rectangular cross-section is usually used. As discussed above, the thickness of such an element is usually of the order of 3 to 6 mils. Since pressing a shape of this thickness is impractical, the conventional method of making such a ceramic element necessitates pressing a thicker shape which is subsequently ground to produce the desired thickness. It is impractical to grind a ceramic element after it has been polarized because of the possible danger that the heat and pressure generated in the grinding process will result in deterioration of the piezoelectric properties of the ceramic. Therefore, the ceramic element is ground to the desired thickness prior to polarization.

A ceramic piezoelectric element which is vibrated in the shear mode is polarized in a direction perpendicular to the direction in which the driving signal is applied. To polarize a ceramic element for such use, electrodes are applied to two opposing edges and the element is treated as described above. Following this polarization step, these electrodes are removed since the element is to be driven by applying a signal in a direction perpendicular to the direction in which the element has been polarized. Accordingly, the two broad faces of the rectangular ceramic element must be coated with a conducting layer.

Since the ceramic is now polarized, electrodes cannot be applied by firing, since subjecting the ceramic to these high temperatures would cause deterioration of its piezoelectric properties. Therefore, electrodes must be applied using a technique such as electroless-nickel plating, which is described in the "Journal of the Electrochemical Society," volume 104, pages 226–230.

It is considered that the success of this invention is due in large measure to the calcining and firing schedules employed. It has been determined that the calcining temperatures and firing temperatures which are necessary to produce a ceramic with the properties depicted in Figs. 1 and 2 are closely inter-related. It has further been determined that this relationship is a function of the specific composition of ceramics being produced.

To produce ceramics in the potassium-sodium-niobate system in accordance with the present process, it has been determined that the preferred calcining range irrespective of composition is 900° C. to 975° C., the optimum range being 930° C. to 950° C.

The time of the calcining step is not particularly critical, the preferred time residing in the range of eight to sixteen hours. As is well known in the art, reactions proceed at a greater rate as the temperature is increased and, therefore, as the calcining temperature is increased the reaction time may be reduced accordingly.

Calcining may be carried out at temperatures as low as 750° C. This minimum temperature is determined by considerations of thermodynamics, this being the minimum temperautre at which the components will react to form the desired niobate composition.

Temperatures as high as 1000° C. may be employed in the calcining step of the present process. However, at temperatures substantially greater than this maximum, undesirable sintering of the particles occurs.

The firing temperatures which must be used to produce ceramics with properties depicted in Figs. 1 and 2 are dependent upon the specific composition of the ceramic being produced and upon the temperature at which the material was calcined. For calcining temperatures in the preferred range of 900° C. to 975° C., the preferred firing temperature for a ceramic which corresponds to the formula $K_{.9}Na_{.1}(NbO_3)$ lies in the range of 1045° C. to 1055° C., the optimum firing temperature being 1050° C. The optimum temperature and the preferred range increase from this point at a rate of 1.5° C. for a one percent increase in the ratio of the moles of sodium to the sum of the moles of sodium and potassium. Thus, a ceramic corresponding to the formula $K_{.2}Na_{.8}(NbO_3)$ is fired in the preferred range of 1150° C. to 1160° C. A ceramic containing equal moles of sodium and potassium, corresponding to a formula $K_{.5}Na_{.5}(NbO_3)$ is fired in the preferred range of 1105° C. to 1115° C., the optimum firing temperature being 1110° C. This is substantiated by empirical data.

At the composition $K_{.2}Na_{.8}(NbO_3)$, the rate of increase in the firing temperature increases from 1.5° C. to 12.5° C. and this rate holds true for compositions up to $K_{.1}Na_{.9}(NbO_3)$. Thus, a ceramic composition corresponding to the formula $K_{.1}Na_{.9}(NbO_3)$ is fired in the preferred range of 1275° C. to 1285° C.

The firing is conducted for a preferred time of five and one-half to six and one-half hours, the optimum time being six hours. This schedule is independent of the firing temperature. In instances where binders are used, it is desirable to heat the ceramic from room temperature up to the firing temperature at a maximum rate of approximately 250° C. per hour to allow the binder to evaporate at a moderate rate. Heating too quickly may cause the ceramic to crack or break due to too rapid a rate of gas evolution.

In instances where the ceramic is calcined at a temperature in the range of 975° C. to 1000° C., it has been determined that the optimum firing temperature, calculated as set forth above, must be increased by 20° C.

This is necessitated by the fact that increasing the calcining temperature decreases the reactivity of the particles produced in the calcination step and, consequently, a higher firing temperature is required. The firing times are the same as that set forth above. Thus, the optimum firing temperature range of 1045° C. to 1055° C. has an upper limit of 1075° C. when the ceramic composition is calcined at a temperature in the range of 975° C. to 1000° C.

In those instances where the ceramic is calcined at a temperature in the range of 750° C. to 900° C., the firing temperature calculated as above must be decreased by approximately 15° C. Use of higher firing temperatures produces over-firing resulting in increased grain size and the formation of voids, both of which are undesirable. In this instance, the firing times are as set forth above. Thus, the optimum firing temperature range of 1045° C. to 1055° C. has a lower limit of 1030° C. when calcining composition at a temperature in the range of 750° C. to 900° C. A ceramic composition corresponding to the formula $K_{.2}Na_{.8}(NbO_3)$ which is calcined at a temperature in the range of 750° C. to 1000° C. requires a firing temperature of 1135° C. to 1180° C. The composition corresponding to the formula $K_{.1}Na_{.9}(NbO_3)$ which is calcined over the same temperature range requires a firing temperature in the range of 1260° C. to 1305° C.

Increasing or decreasing the firing temperature above or below the recited preferred ranges produces unsatisfactory ceramics. It has been determined that firing outside the recited ranges results in a decrease in the density of the ceramic produced regardless of whether the firing temperature is above or below the preferred range. As is discussed in detail below, this decrease in density leads to deterioration of the electrical and piezoelectrical characteristics.

Increasing or decreasing the firing times above or below the prescribed time in accordance with this invention results in ceramics of lower density which, for the reasons to be discussed below, have poor electrical characteristics.

As indicated above, the calcining and firing schedules are considered to be a critical part of the present process. The prescribed schedules are calculated to produce a high density in the final ceramic. A low density ceramic has air incorporated in its bulk, and since air has a dielectric constant of near 1.0, which is considerably lower than that of the ceramics of the potassium-sodium-niobate system, it is apparent that a low density ceramic of a given composition will have a lower dielectric constant than a high density ceramic of the same composition.

The direct-current resistance of the ceramics of the type under discussion is also dependent upon this processing. Thus, air incorporated into the ceramic will ionize when subjected to high voltage fields thus lowering the effective electrical resistance of the ceramic. The resistance of the ceramic assumes importance during the polarization step. Increasing the temperature at which the polarization is conducted aids the polarization process and tends to increase the electromechanical coupling coefficient of the ceramic. However, at higher temperatures the direct-current resistance decreases and, therefore, the polarizing field to which the ceramic is subjected must be decreased in order to prevent damaging the ceramic. Decreasing the strength of the field reduces the effect of the polarization, and the gain derived from use of the increased temperature is offset. However, if the direct-current resistance of the ceramic is high, that is to say if the density is high, a higher polarization temperature may be employed without decreasing the strength of the polarization field, the net effect of which is an increase in the electromechanical coupling coefficient.

A consideration with respect to ceramic elements destined for use in delay line applications is the microstructure of the ceramic. Thus, although the requirement for high density may be met, it is possible that the material produced is non-uniform throughout its bulk, having very high densities in one area and large voids in another. Deviation from the prescribed firing and calcining schedules of this invention may produce non-uniform material which is unsuitable for use in the thin sections required for delay line applications.

For the foregoing reasons and others, it is to be appreciated that the prescribed firing and calcining schedules must be closely adhered to in order to produce satisfactory ceramic transducer elements.

An example of the practice of this invention is described in detail below. Although the composition of the ceramic produced corresponds to $K_{.5}Na_{.5}(NbO_3)$, it is to be appreciated that the method of producing ceramics in accordance with this invention is identical irrespective of the specific composition, the only differance being in the calcining and firing schedules as described above.

*Example*

The following quantities of components were weighted, the amounts corresponding in proportion to 1.001 moles of potassium carbonate, 1.001 moles of sodium carbonate, and two moles of niobium pentoxide.

| | Grams |
|---|---|
| Potassium carbonate | 76.17 |
| Sodium carbonate | 58.43 |
| Niobium pentoxide | 292.40 |

This composition provides a 1/10 mole percent excess of each carbonate over the stoichiometric quantities.

The above measured quantities were placed into a ball mill of one quart capacity. Approximately one-third of a quart of alumina balls, 3/4 inch in diameter, and 300 cubic centimeters of absolute ethyl alcohol were also placed in the ball mill. The materials were milled for sixteen hours.

The mixture of components was then dried in an oven at a temperature of 105° C., and then sieved through a 100 mesh screen.

The screened material was placed in a platinum crucible which was introduced into an electric globar-type furnace maintained at a temperature of 950° C. The material was allowed to remain in the furnance for a period of sixteen hours after which the crucible was removed and allowed to cool to room temperature.

The calcined material was screened through a 40 mesh screen and then leached with a hot aqueous solution of potassium carbonate, 2 percent by weight. This leaching step was repeated twice and the resultant solid washed with boiling distilled water until the wash water tested to a pH of 7.

The solid was then filtered and dried in an oven at a temperature of approximately 105° C. Following the drying the solid material was screened using a 100 mesh screen.

The dried powder was pressed in the shape of a disk .375 inch in diameter and .060 inch thick using a pressure of approximately 5,000 pounds per square inch.

The pressed disk was placed on a platinum sheet and introduced into an electric globar-type furnace. The furnace was heated from room temperature to 1110° C. at a rate of 200° C. per hour. The disk was allowed to soak at 1110° C. for a period of six hours at which time power to the furnace was cut off. The ceramic was allowed to remain in the furnace until it reached room temperature.

Conventional silver paste was applied to the broad face of the disk and fired in the conventional manner to produce silver electrodes. Electrical lead wires were connected to these broad faces and the ceramic immersed in a silicone oil which was heated to a temperature of 220° C. A direct current potential of 2000 volts was applied across the ceramic disk. The temperature of the oil bath was decreased at approximately 3° C. per minute and the ceramic was removed from the bath after a period of approximately one hour.

The resultant disk was tested and found to have a dielectric constant of 300 and an electromechanical coupling coefficient of 34 percent measured in the radial mode.

It is to be understood that the specific example disclosed above is merely illustrative of the general principles of this invention. Various modifications may be devised by one skilled in the art without departing from the spirit and scope of this invention. It is further to be appreciated that although the ceramics produced in accordance with this invention are ideally suited for use in delay line applications, these ceramics are also suitable in any other application requiring a body with piezoelectric properties. The entire range of ceramics produced by this invention are possessed of coupling coefficients which compare favorably with those of piezoelectric ceramics presently known in the art.

What is claimed is:

1. The method of producing a ceramic in the potassium-sodium-niobate system in the range of from $K_{.9}Na_{.1}(NbO_3)$ to $K_{.1}Na_{.9}(NbO_3)$ comprising the steps of combining sodium carbonate ($Na_2CO_3$), potassium carbonate ($K_2CO_3$) and niobium pentoxide ($Nb_2O_5$) in proportions such that the ratio of the moles of niobium pentoxide to the sum of the moles of potassium carbonate and sodium carbonate is approximately unity and the ratio of the moles of sodium carbonate to the moles of potassium carbonate is in the range of from approximately 1:9 to 9:1 and corresponds to the ratio of the moles of sodium to the moles of potassium in the ceramic being produced, calcining the mixture at a temperature in the range of 750° C. to 1050° C. molding the calcined material into a desired shape, and firing the shape in accordance with the following schedule:

| Composition, $K_{.9}Na_{.1}(NbO_3)$ | Firing Temperature Range, 1,030° C. to 1,075° C. |
|---|---|
| $K_{.9}Na_{.1}(NbO_3)$ to $K_{.2}Na_{.8}(NbO_3)$. | The outer limits of the firing range for $K_{.9}Na_{.1}(NbO_3)$ are increased at a rate of 1.5° C. for a 1 percent increase in the ratio of the moles of sodium to the sum of the moles of sodium and potassium, to give a firing range of 1,135° C. to 1,180° C. for a composition corresponding to $K_{.2}Na_{.8}(NbO_3)$. |
| $K_{.2}Na_{.8}(NbO_3)$ to $K_{.1}Na_{.9}(NbO_3)$. | The outer limits of the firing range for $K_{.2}Na_{.8}(NbO_3)$ are increased at a rate of 12.5° C. for a 1 percent increase in the ratio of the moles of sodium to the sum of the moles of sodium and potassium, to give a firing range of 1,260° C. to 1,305° C. for a composition corresponding to $K_{.1}Na_{.9}(NbO_3)$. |

2. The method in accordance with claim 1 wherein calcination is at a temperature in the range of 900° C. to 975° C. and firing the shape at a temperature in accordance with the following schedule:

| Composition, $K_{.9}Na_{.1}(NbO_3)$ | Firing Temperature Range, 1,045° C. to 1,055° C. |
|---|---|
| $K_{.9}Na_{.1}(NbO_3)$ to $K_{.2}Na_{.8}(NbO_3)$. | The outer limits of the firing range for $K_{.9}Na_{.1}(NbO_3)$ are increased at a rate of 1.5° C. for a 1 percent increase in the ratio of the moles of sodium to the sum of the moles of sodium and potassium, to give a firing range of 1,150° C. to 1,160° C. for a composition corresponding to $K_{.2}Na_{.8}(NbO_3)$. |
| $K_{.2}Na_{.8}(NbO_3)$ to $K_{.1}Na_{.9}(NbO_3)$ | The outer limits of the firing range for $K_{.2}Na_{.8}(NbO_3)$ are increased at a rate of 12.5° C. for a 1 percent increase in the ratio of the moles of sodium to the sum of the moles of sodium and potassium to give a firing range of 1,275° C. to 1,285° C. |

3. The method in accordance with claim 1 in which the ceramic produced corresponds to the formula $K_{.5}Na_{.5}(NbO_3)$, the calcining temperature is approximately 950° C., and the firing temperature is approximately 1110° C.

4. The method in accordance with claim 1 in which, following the firing step, the ceramic is polarized to impart piezoelectric properties.

5. The method in accordance with claim 2 wherein the duration of the calcining step is from eight to sixteen hours and the duration of the firing step is from five and one-half to six and one-half hours.

References Cited in the file of this patent

UNITED STATES PATENTS

| | | |
|---|---|---|
| 2,598,707 | Matthias | June 3, 1952 |

| | | |
|---|---|---|
| 2,706,326 | Mason | Apr. 19, 1955 |
| 2,729,757 | Goodman | Jan. 3, 1956 |
| 2,742,370 | Wainer | Apr. 17, 1956 |
| 2,777,773 | Callahan | Jan. 15, 1957 |
| 2,805,165 | Goodman | Sept. 3, 1957 |
| 2,849,404 | Jaffe et al. | Aug. 26, 1958 |
| 2,864,713 | Lewis | Dec. 16, 1958 |

OTHER REFERENCES

Shirane et al.: "Some Aspects of Ferroelectricity," Proceedings of the IRE, December 1955, pp. 1738–1793, page 1760.